United States Patent
Kishi et al.

(10) Patent No.: US 11,845,389 B2
(45) Date of Patent: Dec. 19, 2023

(54) VEHICLE BUMPER STRUCTURE

(71) Applicant: SUBARU CORPORATION, Tokyo (JP)

(72) Inventors: Yuta Kishi, Tokyo (JP); Wataru Yanagisawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 80 days.

(21) Appl. No.: 17/521,628

(22) Filed: Nov. 8, 2021

(65) Prior Publication Data

US 2022/0185211 A1 Jun. 16, 2022

(30) Foreign Application Priority Data

Dec. 10, 2020 (JP) ................. 2020-205428

(51) Int. Cl.
*B60R 19/18* (2006.01)
*B60R 19/12* (2006.01)

(52) U.S. Cl.
CPC .............. *B60R 19/18* (2013.01); *B60R 19/12* (2013.01); *B60R 2019/186* (2013.01)

(58) Field of Classification Search
CPC .... B60R 19/18; B60R 19/12; B60R 2019/186
See application file for complete search history.

(56) References Cited

U.S. PATENT DOCUMENTS

2014/0001780 A1   1/2014   Inoue

FOREIGN PATENT DOCUMENTS

DE       102016213931 A1 *  2/2018
WO       WO 2012/124058 A1   9/2012

OTHER PUBLICATIONS

DE-102016213931-A1 computer translation (Year: 2018).*

* cited by examiner

*Primary Examiner* — Dennis H Pedder
*Assistant Examiner* — Melissa Ann Bonifazi
(74) *Attorney, Agent, or Firm* — McGinn I.P. Law Group, PLLC

(57) ABSTRACT

A vehicle bumper structure to be applied to a vehicle includes an impact absorber to be disposed on a front end side or a rear end side of the vehicle so as to extends in a vehicle width direction. The impact absorber includes small reaction section and a large reaction section. The small reaction section is to be disposed on an outer end side in the vehicle width direction. The small reaction section is configured to generate a predetermined reaction against a colliding object. The large reaction section is to be disposed on an inner side of the small reaction section in the vehicle width direction. The large reaction section is adjacent to the small reaction section. The large reaction section is configured to generate a larger reaction against the colliding object than the predetermined reaction.

20 Claims, 3 Drawing Sheets

VEHICLE BUMPER STRUCTURE

CROSS-REFERENCE TO RELATED APPLICATIONS

The present application claims priority from Japanese Patent Application No. 2020-205428 filed on Dec. 10, 2020, the entire contents of which are hereby incorporated by reference.

BACKGROUND

The present disclosure relates to a vehicle bumper structure including an impact absorber extending in a vehicle width direction.

There has been a vehicle bumper structure including a front bumper reinforcement extending in a vehicle width direction and a bumper absorber provided on a front surface portion of the front bumper reinforcement (see, for example, International Patent Application Publication WO 2012/124058 A1).

SUMMARY

An aspect of the disclosure provides a vehicle bumper structure to be applied to a vehicle. The vehicle bumper structure includes a first impact absorber to be disposed on a front end side or a rear end side of the vehicle so as to extend in a vehicle width direction. The first impact absorber includes a small reaction section and a large reaction section. The small reaction section is to be disposed on an outer end side in the vehicle width direction. The small reaction section is configured to generate a predetermined reaction against a colliding object. The large reaction section is to be disposed on an inner side of the small reaction section in the vehicle width direction. The large reaction section is adjacent to the small reaction section. The large reaction section is configured to generate a larger reaction against the colliding object than the predetermined reaction.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In the bumper structure described in WO 2012/124058 A1, an outer surface of an end portion of the bumper absorber in the vehicle width direction is an inclined surface that is outwardly inclined in the vehicle width direction toward a rear side, and a plate-shaped member made of a metal is attached to the inclined surface. In the bumper structure, when a colliding object collides with an end portion of a front portion of the vehicle in the vehicle width direction, the plate-shaped member of the inclined surface of the bumper absorber deflects the colliding object outward in the vehicle width direction to prevent the colliding object from abutting against the front bumper reinforcement via the bumper absorber.

However, since the plate-shaped member of the inclined surface of the bumper absorber deflects the colliding object outward in the vehicle width direction, the bumper structure described in WO 2012/124058 A1 may not sufficiently absorb energy during a collision with the colliding object.

The present disclosure has been made in view of the above circumstances, and it is desirable to provide a vehicle bumper structure capable of sufficiently absorbing energy during a collision with a colliding object.

Figure 1:
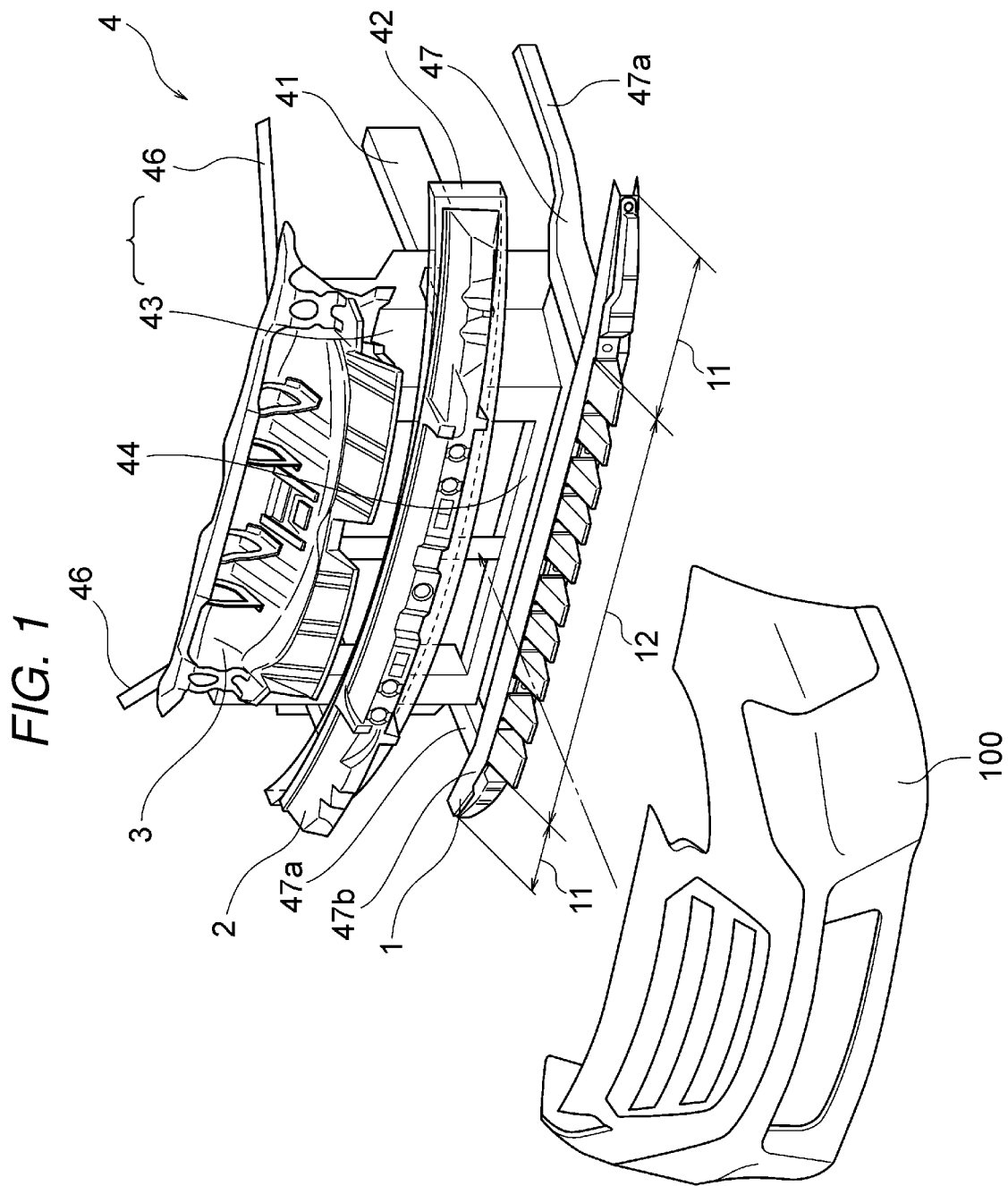
FIG. 1 is a perspective view of a vehicle bumper structure according to an embodiment of the present disclosure.
Figure 2:
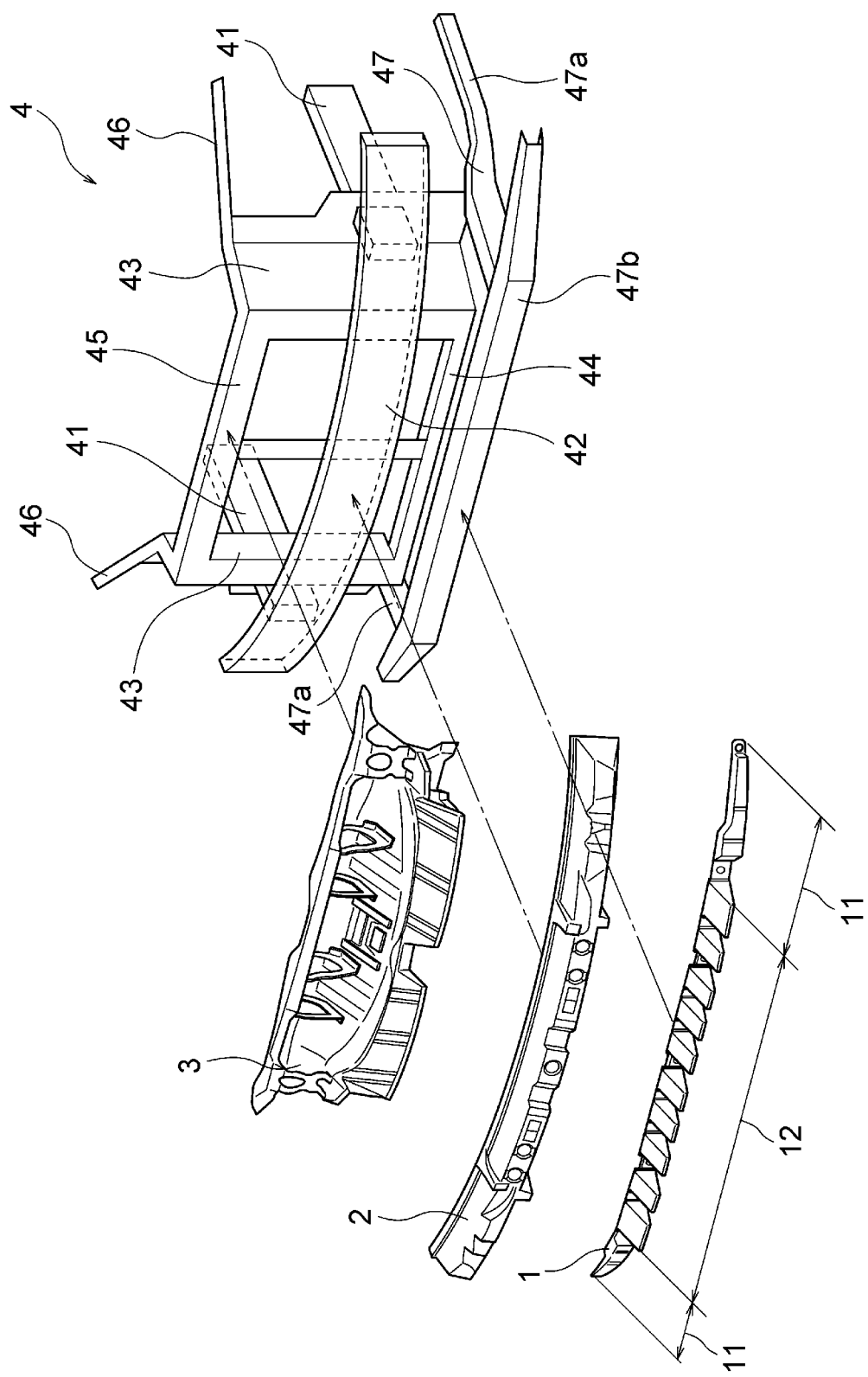
FIG. 2 is an exploded perspective view of the vehicle bumper structure.
Figure 3:
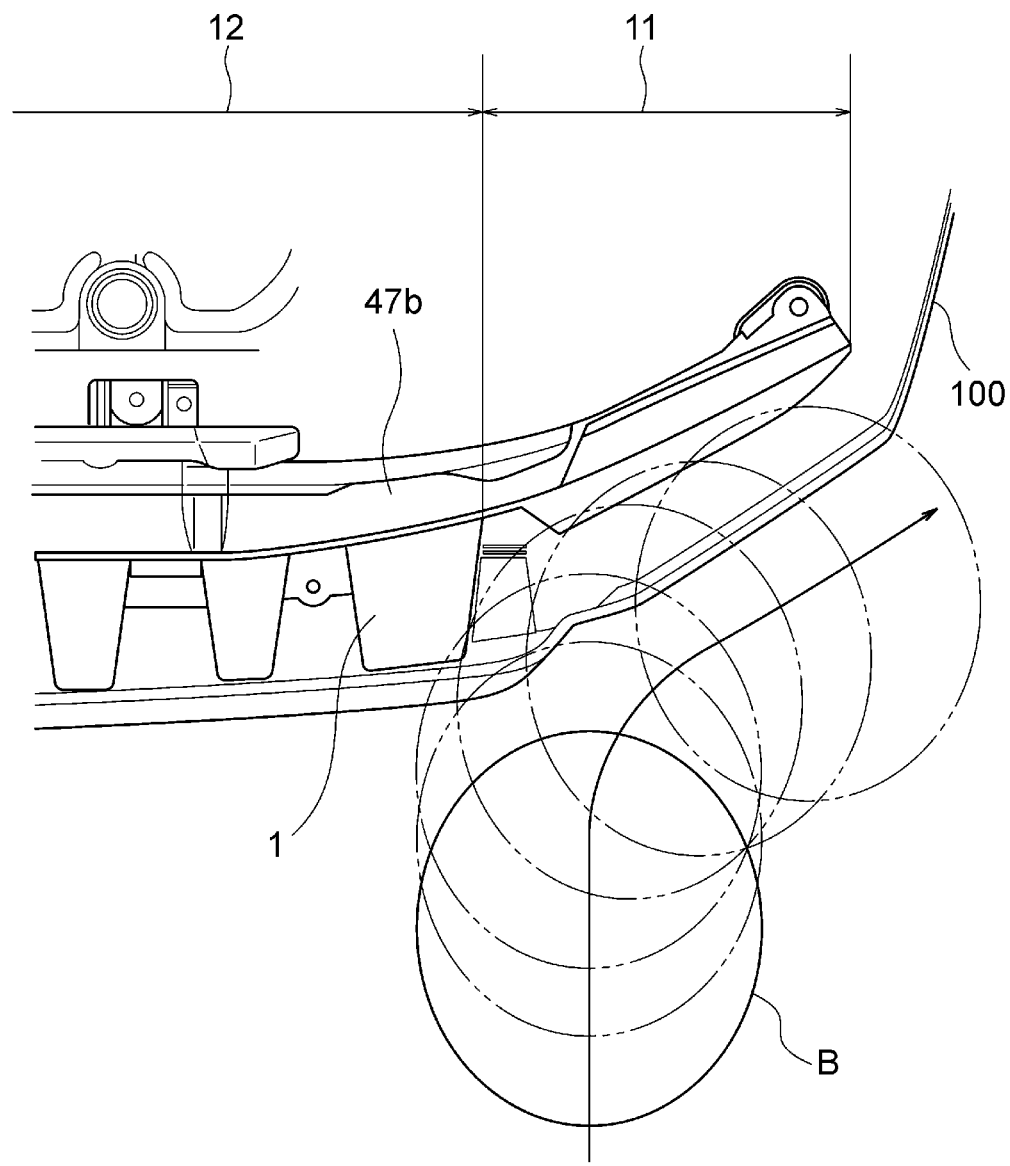
FIG. 3 is a plan view illustrating the bumper structure and a movement path of a colliding object during a collision.

FIGS. 1 to 3 illustrate an embodiment of the present disclosure. FIG. 1 is a perspective view illustrating a vehicle bumper structure, FIG. 2 is an exploded perspective view of the vehicle bumper structure, and FIG. 3 is a plan view illustrating the bumper structure and a movement path of a colliding object during a collision.

As illustrated in FIG. 1, the vehicle bumper structure includes a plurality of impact absorbers 1, 2, and 3 extending in a vehicle width direction behind a bumper face 100 that forms a design surface at a front end of the vehicle. FIG. 1 illustrates a state in which the bumper face 100 is removed from a vehicle body 4 for the sake of explanation. The vehicle bumper structure of the present embodiment includes the three impact absorbers, that is, the lower impact absorber 1, the middle impact absorber 2, and the upper impact absorber 3. Each of the impact absorbers 1, 2, and 3 is fixed to a predetermined portion of the vehicle body 4.

As illustrated in FIG. 2, the vehicle body 4 is formed by (i) assembling panel-shaped members formed by press-molding, for example, steel plates, and (ii) joining the panel-shaped members by spot welding or the like. The vehicle body 4 includes a pair of left and right side frames 41 extending in a front-rear direction, a bumper beam 42 coupling front ends of the respective side frames 41 via brackets and extending in the vehicle width direction, a pair of left and right radiator panels 43 coupled to front end sides of the respective side frames 41 and extending in an up-down direction, a radiator lower support 44 coupling lower ends of the respective radiator panels 43 and extending in the vehicle width direction, a radiator upper support 45 coupling upper ends of the respective radiator panels 43 and extending in the vehicle width direction, and a pair of left and right coupling members 46 coupling vehicle end portions of the radiator upper support 45 in the vehicle width direction and a pair of left and right upper frames (not illustrated) extending in the front-rear direction. The bumper beam 42 is longer in the vehicle width direction than the radiator upper support 45 and extends further outwards in the vehicle width direction than the radiator upper support 45. A pair of left and right headlamps (not illustrated) is disposed on an outer side in the vehicle width direction of the radiator upper support 45.

The vehicle body 4 includes a sub frame 47. The sub frame 47 includes a pair of left and right first portions 47a extending in the front-rear direction below the side frames 41, and a second portion 47b coupling front ends of the first portions 47a and extending in the vehicle width direction. The second portion 47b is disposed in front of the radiator lower support 44.

The lower impact absorber 1 is provided on a front side of the second portion 47b of the sub frame 47. In one embodiment, the lower impact absorber 1 may serve as a "first impact absorber". The lower impact absorber 1 is made of any material, and may be made of, for example, a resin. In the present embodiment, the lower impact absorber 1 is made of non-foamed polypropylene. The lower impact absorber 1 includes a pair of left and right small reaction sections 11 on an outer end side in the vehicle width direction and a large reaction section 12 disposed on an inner side of each small reaction section 11 in the vehicle width direction. The large reaction section 12 is adjacent to the small reaction sections 11. Each small reaction section 11 generates a predetermined reaction against the colliding object. The large reaction section 12 generates a larger reaction against the colliding object than the reaction that the small reaction section 11 generates.

The small reaction section 11 may have a substantially constant thickness in the front-rear direction over the vehicle width direction. For example, the second portion 47b of the sub frame 47 has a closed cross section having a quadrangular shape in a side view, and the small reaction section 11 extends along a front surface of the second portion 47b and is relatively thin in the front-rear direction. In the present embodiment, end portions of the second portion 47b of the sub frame 47 are rearwardly inclined toward the outer side in the vehicle width direction, and each of the small reaction sections 11 is rearwardly inclined toward the outer side in the vehicle width direction along the second portion 47b.

Meanwhile, in the large reaction section 12, portions protruding forward from the second portion 47b are intermittently provided over the vehicle width direction. A step is provided at a boundary between the small reaction section 11 and the large reaction section 12, so that the reaction sharply changes at the boundary between the small reaction section 11 and the large reaction section 12. The portions protruding forward from the second portion 47b may be provided continue to each other. In one example, the large reaction section 11 has a predetermined thickness in the up-down direction, and relatively largely protrudes forward from the front surface of the second portion 47b.

The middle impact absorber 2 is provided on a front side of the bumper beam 42. The middle impact absorber 2 is made of any material, and may be made of, for example, a resin. In the present embodiment, the middle impact absorber 2 is made of foamed polypropylene. In the present embodiment, a length of the middle impact absorber 2 in the vehicle width direction is substantially the same as that of the lower impact absorber 1. The middle impact absorber 2 has recesses or holes in a front portion thereof, but has substantially the same thickness in the front-rear direction along the front surface of the bumper beam 42.

The upper impact absorber 3 is provided on a front side of the radiator upper support 45. In one embodiment, the upper impact absorber 3 may serve as a second impact absorber. The upper impact absorber 3 is made of any material, and may be made of, for example, a metal. In the present embodiment, the upper impact absorber 3 is made of a steel plate. Further, a dimension of the upper impact absorber 3 in the vehicle width direction is shorter than that of the lower impact absorber 1. In the present embodiment, the upper impact absorber 3 is disposed on the inner side of each of the small reaction sections 11 of the lower impact absorber 1 in the vehicle width direction.

In the vehicle bumper structure configured as described above, as illustrated in FIG. 3, the small reaction sections 11 and the large reaction section 12 are adjacent to each other in the lower impact absorber 1. Therefore, a colliding object B colliding with the vicinity of a boundary between the small reaction section 11 and the large reaction section 12 is guided toward the small reaction section 11 which has the smaller reaction, that is, outwardly in the vehicle width direction. Since the small reaction section 11 has the substantially constant thickness in the vehicle width direction, the reaction rapidly changes at the boundary between the small reaction section 11 and the large reaction section 12, but the reaction does not rapidly change in the small reaction section 11. The colliding object B guided outwardly in the vehicle width direction moves outwardly in the vehicle width direction along the small reaction section 11 of the lower impact absorber 1, and the small reaction section 11 absorbs energy during the collision with the colliding object B. In this way, changing a moving direction of the colliding object B during the collision to a direction different from an intrusion direction increases a stroke amount and the energy absorption capacity of the colliding object B. In the present embodiment, the energy absorption capacity of the lower impact absorber 1 is increased, which is advantageous for protecting a leg of a pedestrian when the vehicle collides with the pedestrian.

According to the vehicle bumper structure, as illustrated in FIG. 3, the small reaction section 11 of the lower impact absorber 1 is rearwardly inclined toward the outer side in the vehicle width direction. Therefore, the colliding object B moving rearward relative to the vehicle is easily moved outwardly in the vehicle width direction. Accordingly, the colliding object B can be smoothly moved to the outer side in the vehicle width direction during the collision, in combination with such a structure that the rearward inclination of the front end of the vehicle increases toward the outer side in the vehicle width direction. Therefore, the stroke amount of the colliding object B can be ensured properly.

The small reaction section 11 may be made thin in the front-rear direction. For example, the bumper face 100 may be disposed close to the small reaction section 11, or a predetermined in-vehicle component may be mounted in the vicinity of the small reaction section 11, so that a degree of freedom in shaping and a degree of freedom in design in the vicinity of the small reaction section 11 of the vehicle can be enhanced.

The small reaction sections 11 of the lower impact absorber 1 are disposed on the outer side, in the vehicle width direction, of the end portions of the upper impact absorber 3 in the vehicle width direction. Therefore, even in a section in the vehicle width direction where the upper impact absorber 3 does not absorb energy during a collision, the small reaction sections 11 which has the relatively large energy absorption capacity can absorb energy during the collision. Accordingly, the energy absorption capacity on the outer side of the upper impact absorber 3 in the vehicle width direction during a collision can be enhanced. When the vehicle collides with a pedestrian, an intrusion amount of an upper limb is likely to be relatively large on the outer side in a vehicle width direction of a vehicle where no upper impact absorber 3 is disposed. In the present embodiment, the energy absorption capacity of the lower impact absorber 1 is increased, so that an increase in an injury value can be prevented.

In the above-described embodiment, the present disclosure is applied to the bumper structure on the vehicle front end side. The present disclosure is also applicable to a bumper structure on a vehicle rear end side. In the embodiment, the bumper structure includes the three impact absorbers. The number of impact absorbers may be freely changed as long as the bumper structure includes at least one impact absorber having small reaction sections on an outer end side in the vehicle width direction.

In the above-described embodiment, the entirety of each small reaction section 11 of the lower impact absorber 1 is disposed on the outer side of the upper impact absorber 3 in the vehicle width direction. The embodiment is not limited to this structure. At least an end portion of each small reaction section 11 in the vehicle width direction may simply be disposed on the outer side of the upper impact absorber 3 in the vehicle width direction. In the above-described embodiment, the upper impact absorber is shorter than the lower impact absorber. When the lower impact absorber is shorter than the upper impact absorber, the small reaction section may be disposed in the upper impact absorber.

In the above-described embodiment, the small reaction sections 11 and the large reaction section 12 of the lower impact absorber 1 are permanently affixed to each other. Alternatively, the small reaction sections 11 and the large reaction section 12 may be separate from each other. In this case, the small reaction sections 11 and the large reaction section 12 may be made of different materials. Further, the small reaction sections 11 of the lower impact absorber 1 are rearwardly inclined toward the outer side in the vehicle width direction. It is noted that the small reaction sections 11 are not necessarily inclined.

The embodiment of the present disclosure has been described above. It is noted that the embodiment described above does not limit the disclosure according to claims. Further, it is also noted that all combinations of the features described in the embodiment are not essential to achieve the object of the disclosure.

According to the vehicle bumper structure of the present disclosure, the small reaction sections and the large reaction section are disposed adjacent to each other in the impact absorber. Therefore, the colliding object colliding with the vicinity of a boundary between the small reaction section and the large reaction section is guided toward the small reaction section which has the smaller reaction, that is, outward in the vehicle width direction. The colliding object guided outward in the vehicle width direction moves outward in the vehicle width direction along the small reaction section of the impact absorber, so that the energy is absorbed. In this way, changing a moving direction of the colliding object during the collision to a direction different from an intrusion direction increases a stroke amount and the energy absorption capacity of the colliding object.

Further, the reaction sharply changes at the boundary between the small reaction section and the large reaction section, but the reaction does not sharply change in the small reaction section.

Further, the small reaction section of the impact absorber is inwardly inclined in the front-rear direction toward the outer side in the vehicle width direction. Therefore, the colliding object moving inward in the front-rear direction relative to the vehicle is easily moved outward in the vehicle width direction.

Further, at least the end portion in the vehicle width direction of the small reaction sections of the lower impact absorber is disposed on the outer side, in the vehicle width direction, of the end portions of the upper impact absorber in the vehicle width direction. Therefore, in a section in the vehicle width direction where the upper impact absorber does not absorb energy, the small reaction sections having the relatively large energy absorption capacity can absorb energy.

As described above, the vehicle bumper structure of the present disclosure can sufficiently absorb energy during a collision with the colliding object.

The invention claimed is:
1. A vehicle bumper structure to be applied to a vehicle, the vehicle bumper structure comprising:
   a first impact absorber to be disposed on a front end side or a rear end side of the vehicle so as to extend in a vehicle width direction of the vehicle, wherein
   the first impact absorber comprises
      a small reaction section to be disposed on an outer end side in the vehicle width direction and inwardly inclined, the small reaction section being configured to generate a predetermined reaction against a colliding object, and
      a large reaction section to be disposed on an inner side of the small reaction section in the vehicle width direction, the large reaction section being adjacent to the small reaction section, the large reaction section being configured to generate a larger reaction against the colliding object than the predetermined reaction; and
   a second impact absorber disposed above or below the first impact absorber.

2. The vehicle bumper structure according to claim 1, wherein
   the small reaction section of the first impact absorber has a substantially constant thickness in a front-rear direction over the vehicle width direction.

3. The vehicle bumper structure according to claim 1, wherein
   the small reaction section of the first impact absorber is inwardly inclined in a front-rear direction toward an outer side in the vehicle width direction.

4. The vehicle bumper structure according to claim 2, wherein
   the small reaction section of the first impact absorber is inwardly inclined in the front-rear direction toward an outer side in the vehicle width direction.

5. A vehicle bumper structure to be applied to a vehicle, the vehicle bumper structure comprising:
   a first impact absorber to be disposed on a front end side or a rear end side of the vehicle so as to extend in a vehicle width direction of the vehicle, wherein
   the first impact absorber comprises
      a small reaction section to be disposed on an outer end side in the vehicle width direction, the small reaction section being configured to generate a predetermined reaction against a colliding object, and
      a large reaction section to be disposed on an inner side of the small reaction section in the vehicle width direction, the large reaction section being adjacent to the small reaction section, the large reaction section being configured to generate a larger reaction against the colliding object than the predetermined reaction; and
   a second impact absorber to be disposed above or below the first impact absorber, the second impact absorber having a shorter dimension in the vehicle width direction than a dimension of the first impact absorber,
   wherein at least an end portion, in the vehicle width direction, of the small reaction section of the first impact absorber is disposed on an outer side, in the vehicle width direction, of an end portion of the second impact absorber in the vehicle width direction.

6. The vehicle bumper structure according to claim 2, further comprising
   the second impact absorber provided above or below the first impact absorber, the second impact absorber having a shorter dimension in the vehicle width direction than a dimension of the first impact absorber,
   wherein at least an end portion, in the vehicle width direction, of the small reaction section of the first impact absorber is disposed on an outer side, in the vehicle width direction, of an end portion of the second impact absorber in the vehicle width direction.

7. The vehicle bumper structure according to claim 3, further comprising
the second impact absorber provided above or below the first impact absorber, the second impact absorber having a shorter dimension in the vehicle width direction than a dimension of the first impact absorber,
wherein at least an end portion, in the vehicle width direction, of the small reaction section of the first impact absorber is disposed on an outer side, in the vehicle width direction, of an end portion of the second impact absorber in the vehicle width direction.

8. The vehicle bumper structure according to claim 4, further comprising
the second impact absorber provided above or below the first impact absorber, the second impact absorber having a shorter dimension in the vehicle width direction than a dimension of the first impact absorber,
wherein at least an end portion, in the vehicle width direction, of the small reaction section of the first impact absorber is disposed on an outer side, in the vehicle width direction, of an end portion of the second impact absorber in the vehicle width direction.

9. The vehicle bumper structure according to claim 1, wherein the small reaction section is tapering and rearwardly inclined toward the outer end side in the vehicle width direction.

10. The vehicle bumper structure according to claim 1, wherein a plurality of the large reaction sections are intermittently disposed across an outer side of the vehicle.

11. The vehicle bumper structure according to claim 1, wherein a boundary between the small reaction section and the large reaction section is configured to guide the colliding object toward the small reaction section.

12. The vehicle bumper structure according to claim 1, wherein a step up is provided at a boundary from the small reaction section and the large reaction section.

13. The vehicle bumper structure according to claim 1, wherein the small reaction section is disposed on both of the outer end sides of the vehicle.

14. The vehicle bumper structure according to claim 1, wherein a step at a boundary is disposed between the small reaction section and the large reaction section.

15. The vehicle comprising the bumper structure according to claim 1.

16. The vehicle comprising the bumper structure according to claim 5.

17. A vehicle bumper structure, the vehicle bumper structure comprising:
a first impact absorber to be disposed on a front end side or a rear end side of the vehicle so as to extend in a vehicle width direction of the vehicle, wherein
the first impact absorber comprises
a small reaction section to be disposed on an outer end side in the vehicle width direction, the small reaction section being configured to generate a predetermined reaction against a colliding object, and
a large reaction section to be disposed on an inner side of the small reaction section in the vehicle width direction, the large reaction section being adjacent to the small reaction section, the large reaction section being configured to generate a larger reaction against the colliding object than the predetermined reaction,
wherein a step increase is provided at a boundary from the small reaction section and the large reaction section on a front side.

18. The vehicle bumper structure according to claim 17, wherein
the small reaction section of the first impact absorber has a substantially constant thickness in a front-rear direction over the vehicle width direction.

19. The vehicle bumper structure according to claim 17, wherein
the small reaction section of the first impact absorber is inwardly inclined toward an outer side in the vehicle width direction.

20. The vehicle bumper structure according to claim 17, wherein
the small reaction section of the first impact absorber is inwardly inclined in the front-rear direction toward an outer side in the vehicle width direction.

\* \* \* \* \*